(No Model.)
J. P. HELFENSTEIN, Jr.
TENNIS NET.
No. 356,639. Patented Jan. 25, 1887.
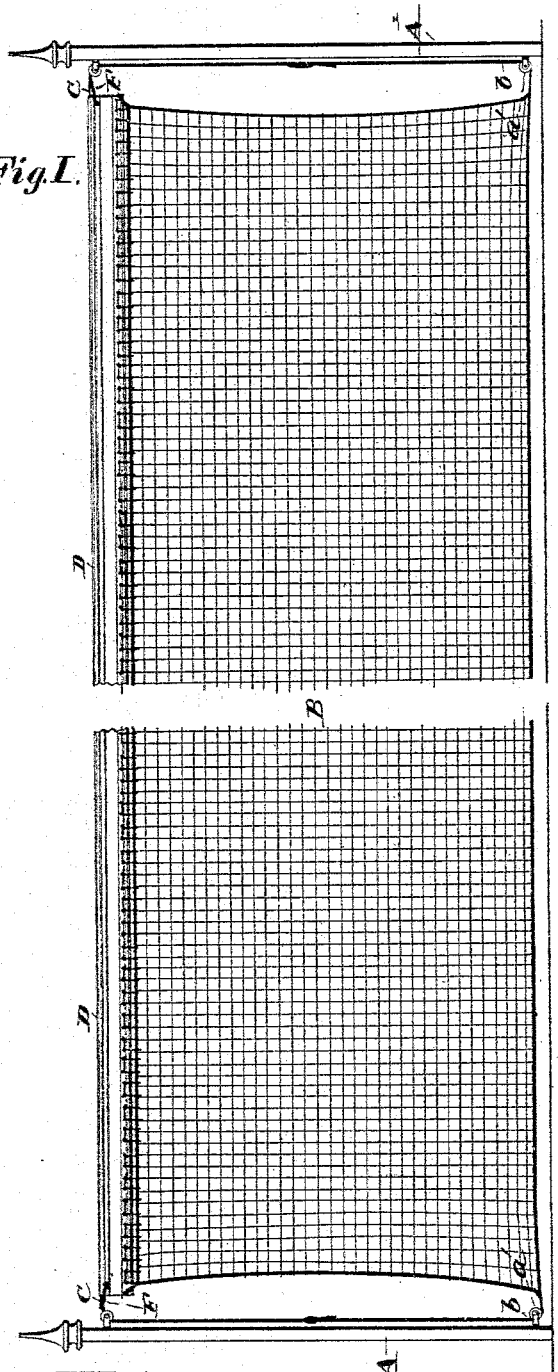
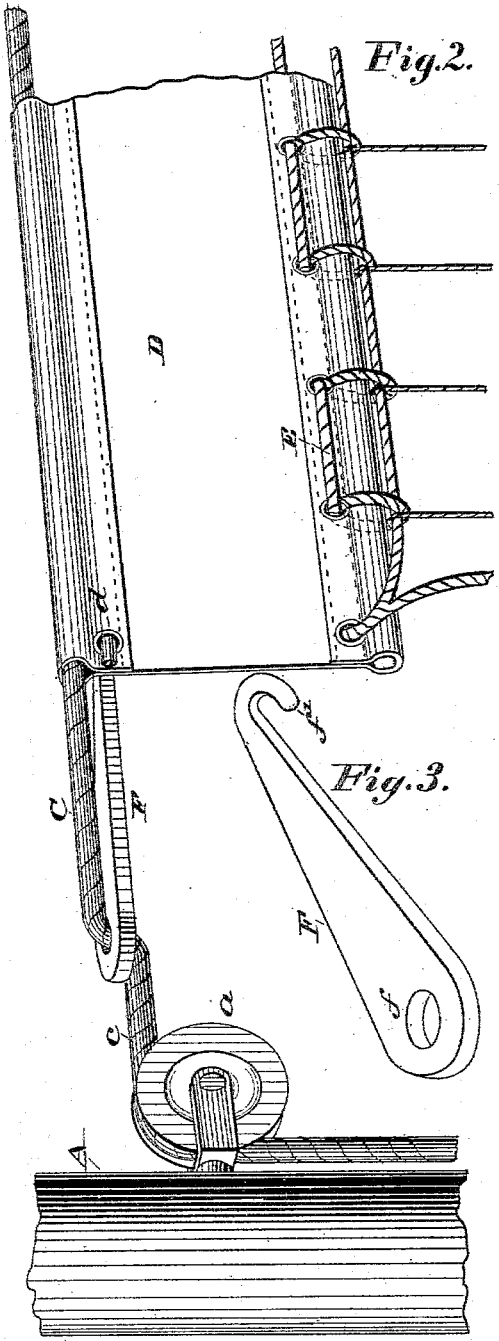
Witnesses:
J. W. Hoke
J. W. Sutherland
Inventor:
John P. Helfenstein Jr.
by C. D. Moody, atty

United States Patent Office.

JOHN P. HELFENSTEIN, JR., OF WEBSTER GROVES, MISSOURI.

TENNIS-NET.

SPECIFICATION forming part of Letters Patent No. 356,639, dated January 25, 1887.

Application filed May 24, 1886. Serial No. 203,097. (No model.)

*To all whom it may concern:*

Be it known that I, JOHN P. HELFENSTEIN, Jr., of Webster Groves, St. Louis county, Missouri, have made a new and useful Improvement in Tennis-Nets, of which the following is a full, clear, and exact description.

As hitherto made and used tennis-nets are liable to sag to an objectionable extent, and the difficulty is increased by reason of the tension to which the net is subjected in attaching it to the poles, for the tighter the cords with which the net at its corners is provided for the purpose of fastening the net to the poles are drawn the more the net is contracted vertically at its central portion. More recently a tennis-net at its top has been provided with a canvas binding, which, however advantageous in various ways, is objectionable in that its weight increases the sag, and, as it is attached to the net so that it is drawn as one piece therewith in stringing the net, it does not operate to any substantial degree to prevent the vertical contraction referred to.

To obviate, or at least to diminish, the difficulties under consideration, as well as to obtain other advantages, hereinafter mentioned, is the aim of the present improvement, which consists, mainly, in providing a directly-overhead support—such as a cord—for the net, capable of being tightly stretched upon the tennis-poles without exerting tension, in a horizontal direction upon the net, which, at its ends and by means of cords or other devices, substantially as hereinafter described, is suitably held in the direction of its length.

The particular means employed for connecting the net with its support above is also a feature of the improvement.

In the annexed drawings, making part of this specification, Figure 1 is a side elevation of the improved net in position. Fig. 2 is a detail upon an enlarged scale, being a view in perspective, showing the construction at one of the upper corners of the net; and Fig. 3 is a view in perspective of one of the hooks for holding the net at its upper corners.

The same letters of reference denote the same parts.

The poles A A' and the net B, saving as modified or supplemented by the present improvement, are of the customary form, and in use are arranged in the customary manner.

C represents a cord or wire capable of being tightly strung between and upon the poles, its ends $c$ being carried over bearings—such as the pulleys $a$—upon the poles, respectively, and secured below in any suitable manner, so that the cord or wire shall be held taut between the poles.

D represents a strip of canvas, drilling, or other similar material, in length equal, or thereabout, to the net, and strung loosely upon the cord C, and at its lower edge provided with a lacing, E, or other device, by which the net is detachably hung from the strip D, substantially as is represented in the drawings. The cord thus serves to uphold the net throughout its length, and to suitably stretch the net in an endwise direction the following method is preferably adopted: The usual cords, $b$ $b$, at the bottom corners of the net are carried, as is customary, around suitable bearings—such as the pulleys $a'$—upon the tennis-poles and fastened in any suitable manner, so that the net, at the lower part thereof, shall be suitably stretched between the poles, and at its upper corners the net is held by means of the hooks F—that is, after the cord C has been stretched, the hook, which at $f$ is perforated to pass onto the cord, and whose other end, $f'$, is hook-shaped, is adjusted upon the cord between the pole and the net, so as to be at the proper distance from the net for engaging therewith, and then upturned and hooked into the strip D at $d$, as shown in Fig. 2. The upturning of the hook upon the cord causes it to be secured, so that it cannot be slipped thereon, and when the strip is attached to the hook the net becomes properly stretched at the top. As resulting from this mode of supporting the net at its upper edge, it is upheld at its upper edge more evenly than hitherto has been attainable, and the net generally is not contracted vertically to the extent previously noticeable; for as any desirable tension can be given to the cord C independently of the net, it is not, in the first place, necessary to impart as much tension to the net as heretofore has been required, and, secondly, the cord resists the tendency of the net to contract vertically whatever tension is given to the net.

Incidentally it is quite an advantage to employ the strip D and to make the net detachable therefrom. The strip imparts a desirable appearance to the structure, and is capable of being finished and ornamented in various ways. It provides a convenient support for the lacing E. When the net is attached, the strip is thereby stretched to its fullest width and smoothly held, and the net and strip can be readily separated from each other for the purpose of renewing the net or for washing the strip.

I claim—

1. A tennis-net provided at the top with a hem through which the supporting-rope is passed, the net being drawn taut and secured to said rope, substantially as described.

2. A tennis-net having a detachable connection with an overhead support in addition to the connections which serve to stretch the net endwise, substantially as described.

3. A tennis-net detachably suspended from a strip which in turn is strung loosely upon a cord or wire that is stretched upon the tennis-poles, substantially as described.

4. A tennis-net suspended from a strip which in turn is strung upon a cord or wire that is stretched upon the tennis-poles, substantially as described.

5. The combination of the poles A A', the net B, the cord or wire C, the strip D, and the lacing, as described.

6. The combination of the poles A A', the net B, the cord or wire C, the strip D, the lacing E, the cords $b$, and the hooks F, as described.

Witness my hand.

JOHN P. HELFENSTEIN, JR.

Witnesses:
C. D. MOODY,
N. B. ANDERSON.